(12) United States Patent
Shionozaki

(10) Patent No.: US 8,477,014 B2
(45) Date of Patent: Jul. 2, 2013

(54) RADIO COMMUNICATION APPARATUS, INFORMATION PROCESSING SYSTEM, PROGRAM AND RADIO COMMUNICATION METHOD

(75) Inventor: Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 591 days.

(21) Appl. No.: 12/675,694

(22) PCT Filed: Aug. 13, 2008

(86) PCT No.: PCT/JP2008/064537
§ 371 (c)(1),
(2), (4) Date: Feb. 26, 2010

(87) PCT Pub. No.: WO2009/034809
PCT Pub. Date: Mar. 19, 2009

(65) Prior Publication Data
US 2010/0253536 A1    Oct. 7, 2010

(30) Foreign Application Priority Data
Sep. 10, 2007 (JP) ................... 2007-233880

(51) Int. Cl.
*G08B 5/22* (2006.01)
(52) U.S. Cl.
USPC ............... 340/8.1; 340/539.13; 455/456.1
(58) Field of Classification Search
USPC ............ 340/8.1, 539.13, 539.21; 455/456.1, 455/456.3, 456.6, 457
See application file for complete search history.

(56) References Cited

U.S. PATENT DOCUMENTS

| 6,275,186 | B1 * | 8/2001 | Kong ........................... 342/363 |
| 2006/0095349 | A1 | 5/2006 | Morgan et al. |
| 2006/0176848 | A1 * | 8/2006 | Kimura ......................... 370/328 |
| 2006/0178107 | A1 * | 8/2006 | Taniguchi .................... 455/12.1 |
| 2008/0004037 | A1 * | 1/2008 | Achlioptas et al. ........ 455/456.1 |

FOREIGN PATENT DOCUMENTS

| JP | 2001-61178 | 3/2001 |
| JP | 2004-040733 | 2/2004 |
| JP | 2004-215302 | 7/2004 |
| JP | 2004-289498 | 10/2004 |
| JP | 2006-194717 | 7/2006 |
| JP | 2006-214933 | 8/2006 |
| JP | 2007-43574 | 2/2007 |

OTHER PUBLICATIONS

English-language International Search Report from the Japanese Patent Office mailed Oct. 21, 2008, for International Application No. PCT/JP2008/064537.

* cited by examiner

*Primary Examiner* — Edwin Holloway, III
(74) *Attorney, Agent, or Firm* — Sherr & Jiang, PLLC

(57) ABSTRACT

There is provided a radio communication apparatus capable of communicating with a base station of radio communication and moved with movement of a movable body, including: a storage unit having position information of unknown base stations whose base station identification information attached to the base station is unknown recorded therein; a notification unit that notifies the movable body or an operation subject of the movable body of the position information of the unknown base stations recorded in the storage unit; a communication unit that receives a radio signal containing the base station identification information from the base stations including the unknown base stations; and a recording unit that records the base station identification information contained in the radio signal received by the communication unit in the storage unit.

11 Claims, 11 Drawing Sheets

FIG. 4

| BASE STATION ID | RECEIVING INTENSITY |
|---|---|
| 30A | −90dBm |
| 30B | −70dBm |
| 30C | −80dBm |
| 30D | −75dBm |
| ⋮ | ⋮ |

FIG. 5

| BASE STATION ID | LONGITUDE | LATITUDE |
|---|---|---|
| 30A | 135.001 | 35.49 |
| 30B | 135.002 | 35.51 |
| 30C | 135.003 | 35.50 |
| 30D | 135.002 | 35.47 |
| ⋮ | ⋮ | ⋮ |

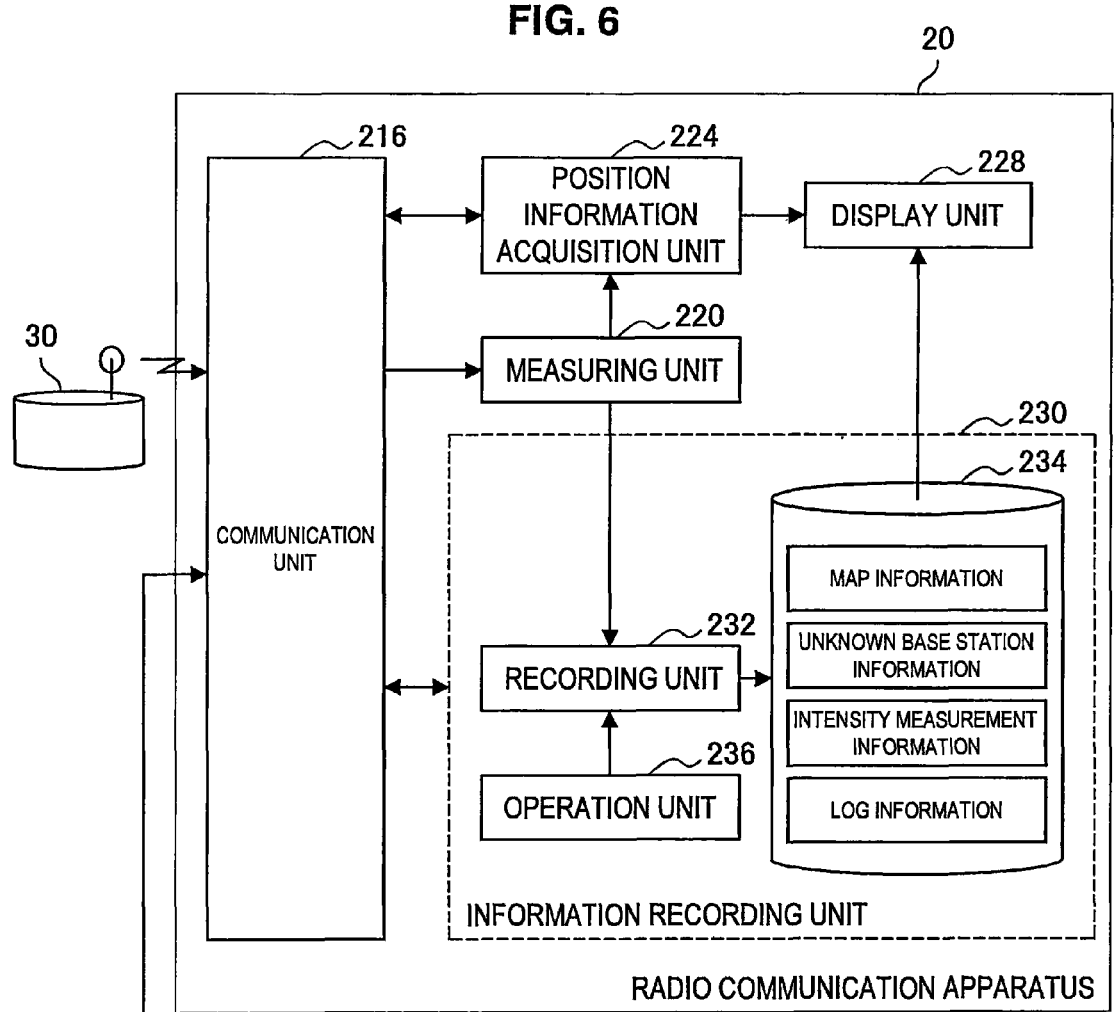
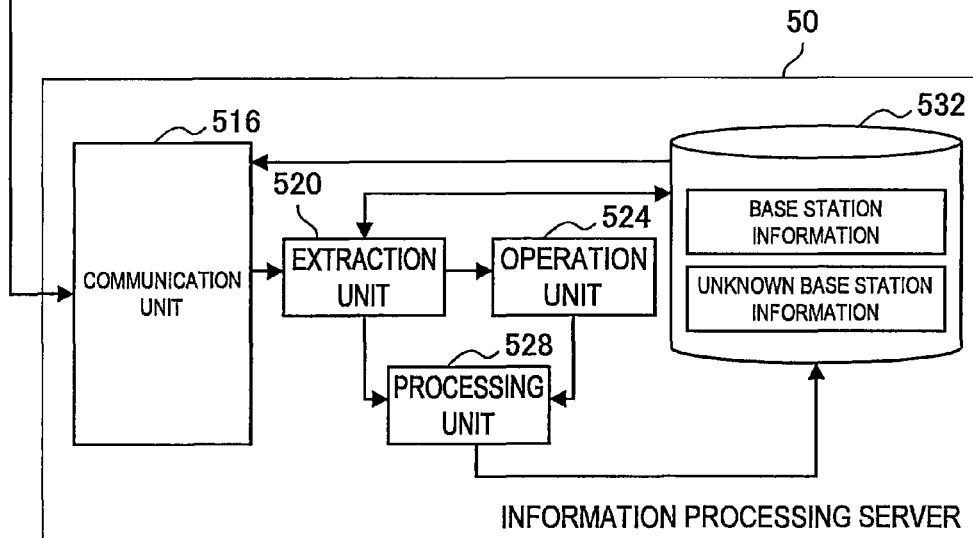
FIG. 6

FIG. 7

| ESSID | LONGITUDE | LATITUDE |
|---|---|---|
| newdoor | 135.005 | 35.41 |
| Livestation | 135.003 | 35.53 |
| newdoor | 134.938 | 36.25 |
| ... | ... | ... |
| ⋮ | ⋮ | ⋮ |

FIG. 12
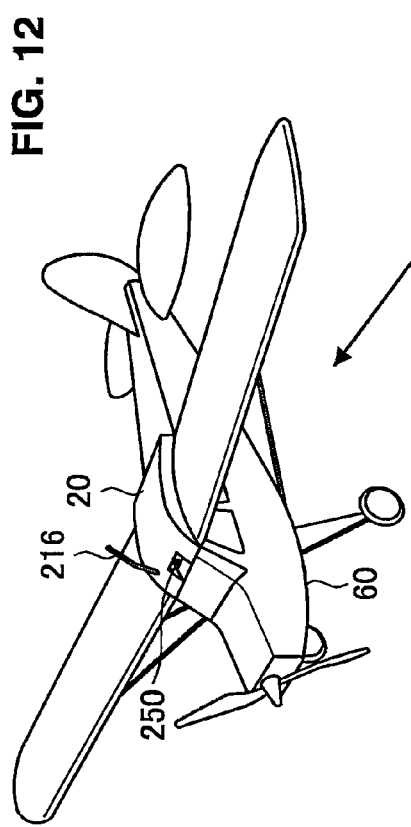
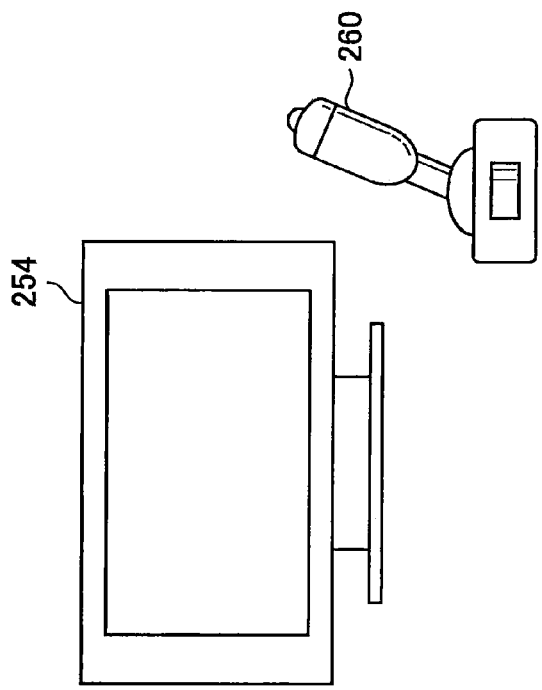

RADIO COMMUNICATION APPARATUS, INFORMATION PROCESSING SYSTEM, PROGRAM AND RADIO COMMUNICATION METHOD

TECHNICAL FIELD

The present invention relates to a radio communication apparatus, an information processing system, a program, and a radio communication method.

BACKGROUND ART

In recent years, radio communication apparatuses capable of communicating with GPS (Global Positioning System) or base stations (access points) of wireless LAN (Local Area Network) have been widely used. Such a radio communication apparatus can estimate the position of the local apparatus by using GPS positioning or wireless LAN. Position estimation technology using such a radio communication apparatus is an important common basic technology in wide-ranging fields such as navigation, security, and entertainment. However, according to the position estimation technology based on GPS positioning, it takes a long time to supplement synchronization during activation and it is difficult to use such a radio communication apparatus indoors or underground where a radio signal from a satellite is not receivable.

The position estimation technology using wireless LAN, on the other hand, is a technology to estimate the position of a radio communication apparatus based on signal strength of radio signals received by the radio communication apparatus from base stations and position information of the base stations registered in advance. Since base stations of wireless LAN are set up also indoors or underground, indoor or underground position estimation is enabled according to the position estimation technology using wireless LAN, which is difficult to achieve according to the position estimation technology based on GPS positioning. That is, the above position estimation method can be considered to be a position estimation technology excellent in convenience and ease if base station information indicating positions of base stations of wireless LAN set up around a radio communication apparatus is registered in a position estimation apparatus.

Thus, technology to construct a database of base station information of wireless LAN has nowadays been proposed. In Patent Document 1, for example, a method by which base station identification information received by a radio communication apparatus having a current position acquisition function and the current position of the radio communication apparatus acquired by the current position acquisition function are associated and registered is described. In Patent Document 2, a method by which base station identification information contained in a radio signal received from a base station of wireless LAN and position information acquired by using a GPS receiving function are associated for registration in a vehicle equipped with the GPS receiving function and wireless LAN communication function is described.

PRIOR ART DOCUMENT

[Patent Document 1] Japanese Patent Application Laid-Open No. 2007-43574
[Patent Document 2] U.S. Patent Application Laid-Open No. 2006-0095349

DISCLOSURE OF THE INVENTION

However, base station information collected by conventional methods depends on, for example, a movement path by a movable body that moves a radio communication apparatus. Therefore, if the movable body moves only in the neighborhood of base stations whose base station information is known, there is a problem that no new base station information is obtained so that the collection of information becomes inefficient.

Thus, the present invention has been made in view of the above problem, and an object of the invention is to provided a novel and improved radio communication apparatus capable of efficiently collecting base station information, an information processing system, a program, and a radio communication method.

In order to solve the above problem, according to an aspect of the invention, there is provided a radio communication apparatus capable of communicating with a base station of radio communication and moved with movement of a movable body, including: a storage unit having position information of unknown base stations whose base station identification information attached to the base station is unknown recorded therein; a notification unit that notifies the movable body or an operation subject of the movable body of the position information of the unknown base stations recorded in the storage unit; a communication unit that receives a radio signal containing the base station identification information from the base stations including the unknown base stations; and a recording unit that records the base station identification information contained in the radio signal received by the communication unit in the storage unit.

With the above configuration, the notification unit notifies a movable body or an operation subject of the movable body of position information of unknown base stations recorded in the storage unit. Thus, the radio communication apparatus can be moved to the neighborhood of the position of an unknown base station with movement of the movable body based on notification of the position information of unknown base stations by the notification unit. Then, the communication unit can receive a radio signal containing base station identification information of the unknown base station from the unknown base station in the neighborhood of the position of the unknown base station. Here, the recording unit records the base station identification information contained in the radio signal received by the communication unit in the storage unit. As a result, base station identification information of unknown base stations is recorded in the storage unit by the recording unit, so that position information of unknown base stations and base station identification information can be associated, which can then be utilized for, for example, subsequent position estimation.

The radio communication apparatus further includes: a position information acquisition unit that acquires the position information of the radio communication apparatus. The communication unit may receive the radio signal in a predetermined period and the recording unit may associate and record an acquisition time of the position information and the position information in the storage unit and associate a receiving time of the radio signal by the communication unit with the base station identification information contained in the radio signal received by the communication unit and record the base station identification information and the receiving time in the storage unit.

With the above configuration, base station identification information recorded in the storage unit by being associated with a receiving time approximating an acquisition time of some piece of position information is the base station identification information contained in the radio signal received by the communication unit near the position of the position information. That is, the base station identification information of a base station present near the position indicated by some piece of position information can be extracted from the position information. Thus, based on position information matching or approximating position information of an unknown base station, base station identification information of the unknown base station can be extracted from base station identification information recorded in the storage unit.

The radio communication further includes a measuring unit that measures receiving intensity of each base station that is a source of the radio signal received by the communication unit. The recording unit may further associate the receiving intensity measured by the measuring unit with the base station identification information and the receiving time of the radio signal and record the base station identification information, the receiving time, and the receiving intensity in the storage unit.

With the above configuration, if a plurality of pieces of base station identification information is extracted based on some piece of position information matching or approximating position information of an unknown base station, the base station identification information of the unknown base station can be identified based on receiving intensity associated with each piece of base station identification information. If, for example, position information of an unknown base station and some piece of position information extremely closely approximate, the base station identification information associated with the greatest signal strength of the plurality of pieces of base station identification information can be determined to be the base station identification information of the unknown base station.

The radio signal may further include base station attached information attached to the base station that is the source of the radio signal, and the recording unit may associate the base station attached information with the base station identification information and record the base station identification information and the base station attached information in the storage unit. If, for example, the base station attached information of the unknown base station is known and a plurality of pieces of the based station identification information is recorded in the storage unit, the base station identification information associated with the base station attached information of the unknown base station can be determined to be the base station identification information of the unknown base station.

The radio communication apparatus further includes an operation unit in which a predetermined operation is performed by the movable body or the operation subject of the movable body. When the predetermined operation is performed in the operation unit, the recording unit may record the base station identification information contained in the radio signal received by the communication unit in the storage unit. If, for example, the predetermined operation is performed near an unknown base station, a radio signal transmitted from the unknown base station is received by the communication unit and thus, the base station identification information of the unknown base station is recorded in the storage unit. As a result, the base station identification information of the unknown base station can be associated with the position information of the unknown base station ex post facto.

The communication unit may transmit the base station identification information recorded in the storage unit by the recording unit. With the above configuration, an information processing apparatus that receives base station identification information recorded in the storage unit from the communication unit can associate the base station identification information of an unknown base station with position information of the base station identification information.

The radio communication apparatus further includes an imaging unit that picks up an image therearound. The notification unit may notify the operation subject of the movable body of the image picked up by the imaging unit. With the above configuration, the operation subject of the movable body can operate movement of the movable body based on images picked up by the imaging unit. Since the radio communication apparatus is moved with movement of the movable body, the radio communication apparatus can record, for example, base station identification information of an unknown base station present at a distant location from the operation subject of the movable body in the storage unit.

Further, in order to solve the above problem, according to another aspect of the invention, there is provided an information processing system including a radio communication apparatus capable of communicating with a base station of radio communication and moved with movement of a movable body and an information processing apparatus that processes information acquired by the radio communication apparatus. The radio communication apparatus includes: a storage unit having position information of unknown base stations whose base station identification information attached to the base station is unknown recorded therein; a notification unit that notifies the movable body or an operation subject of the movable body of the position information of the unknown base stations recorded in the storage unit; a communication unit that receives a radio signal containing the base station identification information transmitted from the base stations including the unknown base stations; and a recording unit that records the base station identification information contained in the radio signal received by the communication unit in the storage unit. The information processing apparatus includes a processing unit that associates the base station identification information contained in the radio signal received by the communication unit near a position of the unknown base stations of the base station identification information recorded in the storage unit and the position information of the unknown base stations.

With the above configuration, the notification unit notifies the movable body or the operation subject of the movable body of position information of an unknown base station recorded in the storage unit. Thus, the radio communication apparatus can be moved to the neighborhood of the position of an unknown base station with movement of the movable body based on notification of the position information of the unknown base station. Then, the communication unit can receive a radio signal containing base station identification information of the unknown base station from the unknown base station in the neighborhood of the position of the unknown base station. Here, the recording unit records the base station identification information contained in the radio signal received by the communication unit in the storage unit. As a result, base station identification information of unknown base stations can be recorded in the storage unit by the recording unit. Thus, the processing unit of the information processing apparatus can efficiently associate base station identification information with position information of unknown base stations, which can then be utilized for, for example, subsequent position estimation by the radio communication apparatus.

The radio communication apparatus may further include a position information acquisition unit that acquires the position information of the radio communication apparatus, the communication unit may receive the radio signal in a predetermined period, the recording unit may associate and record an acquisition time of the position information and the position information in the storage unit and associate a receiving time of the radio signal by the communication unit with the base station identification information contained in the radio signal received by the communication unit and record the base station identification information and the receiving time in the storage unit. Further, the information processing apparatus may further include an extraction unit that extracts an acquisition time of the position information recorded by being associated with the position information whose difference from the position information of the unknown base station is within a first setting range in the storage unit, and the processing unit may associate the base station identification information recorded by being associated with the receiving time whose difference from the acquisition time extracted by the extraction unit is within a second setting range and the position information of the unknown base station.

With the above configuration, base station identification information recorded in the storage unit by being associated with a receiving time approximating an acquisition time of some piece of position information is the base station identification information contained in the radio signal received by the communication unit near the position of the position information. That is, the base station identification information of a base station present near the position indicated by some piece of position information can be extracted from the position information. Thus, based on position information whose difference from position information of an unknown base station is within a first setting range, base station identification information of the unknown base station can be extracted from base station identification information recorded in the storage unit.

The radio communication apparatus may further include a measuring unit that measures receiving intensity of each base station that is a source of the radio signal received by the communication unit, the recording unit may further associate the receiving intensity measured by the measuring unit with the base station identification information and the receiving time of the radio signal and record the base station identification information, the receiving time, and the receiving intensity in the storage unit. Further, the processing unit may associate the base station identification information selected based on receiving intensity associated with the base station identification information of the base station identification information associated with the receiving time whose difference from the acquisition time extracted by the extraction unit is within the second setting range and the position information of the unknown base station.

With the above configuration, if a plurality of base station identification information is extracted based on position information whose difference from position information of an unknown base station is within the first setting range, the base station identification information of the unknown base station can be identified based on receiving intensity associated with each piece of base station identification information. For example, the base station identification information associated with the greatest signal strength of the plurality of base station identification information can be determined to be the base station identification information of the unknown base station.

Further, in order to solve the above problem, according to another aspect of the invention, there is provided a program causing a computer to function as a radio communication apparatus capable of communicating with a base station of radio communication and moved with movement of a movable body, including: a notification unit that notifies the movable body or an operation subject of the movable body of the position information of the unknown base stations recorded in a storage medium; a communication unit that receives a radio signal containing the base station identification information transmitted from the base stations including the unknown base stations; and a recording unit that records the base station identification information contained in the radio signal received by the communication unit in the storage medium.

The above program can cause hardware resources of a computer including, for example, the CPU, ROM, and RAM to execute functions of the notification unit, communication unit, and recording unit described above. That is, a computer using the program can be caused to function as the above radio communication apparatus.

Further, in order to solve the above problem, according to another aspect of the invention, there is provided a radio communication method executed by a radio communication apparatus capable of communicating with a base station of radio communication and moved with movement of a movable body, including the steps of: recording position information of an unknown base station whose base station identification information attached to the base station is unknown in a storage medium; notifying the movable body or an operation subject of the movable body of the position information of the unknown base stations recorded in the storage medium; receiving a radio signal containing the base station identification information transmitted from the base stations including the unknown base stations; and recording the base station identification information contained in the radio signal received from the base station in the storage medium.

According to a radio communication apparatus, an information processing system, a program, and a radio communication method according to the present invention, as described above, base station information can efficiently be collected.

BRIEF DESCRIPTION OF THE DRAWINGS

FIG. 4 is an explanatory view showing an example of receiving intensity measured by a measuring unit;

FIG. 5 is an explanatory view showing an example of base station information stored by a base station information storage unit;

FIG. 6 is a functional block diagram showing the configuration of the radio communication apparatus and an information processing server contained in a base station information collection system according to the present embodiment;

FIG. 7 is an explanatory view showing a concrete example of unknown base station information;

FIG. 12 is an explanatory view showing a modification of the present embodiment.

BEST MODE FOR CARRYING OUT THE INVENTION

Figure 1:
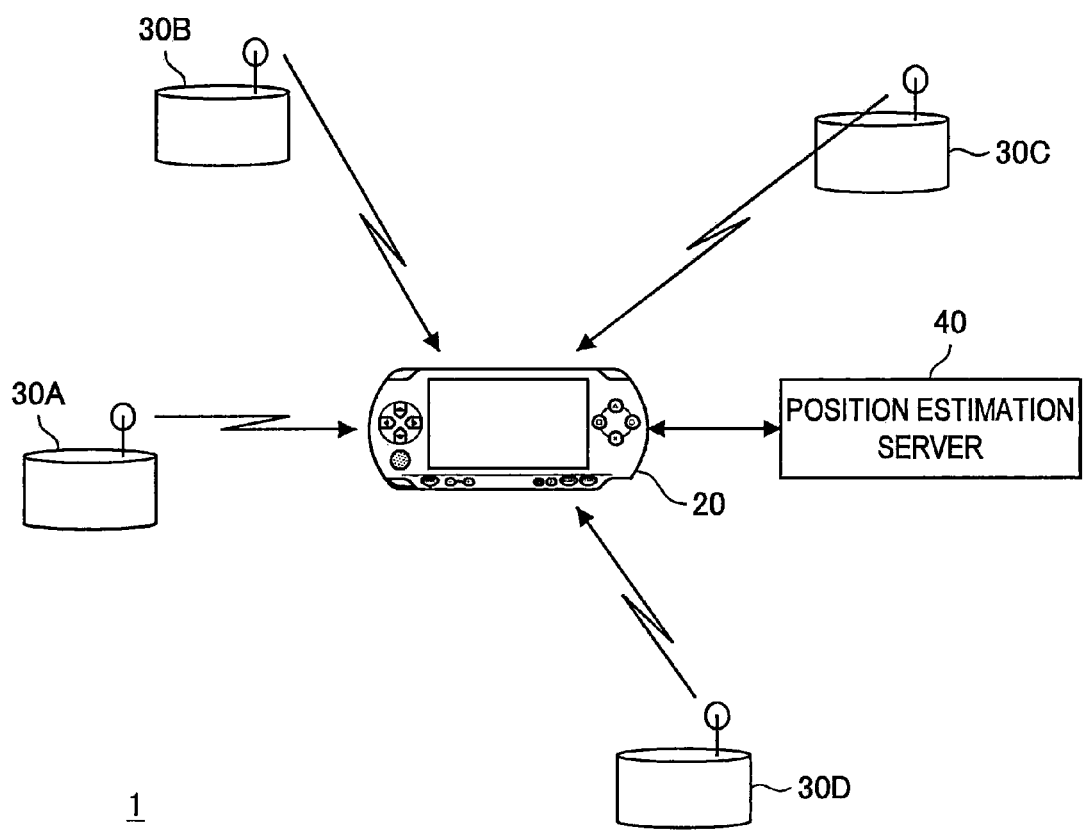
FIG. 1 is an explanatory view showing a configuration example of a position estimation system according to the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The "BEST MODE FOR CARRYING OUT THE INVENTION" will be described according to the order shown below:
[1] Position Estimation System
[1-1] Overview of Position Estimation System
[1-2] Hardware Configuration of Radio Communication Apparatus
[1-3] Function of Position Estimation System
[2] Base Station Information Collection System
[2-1] Overview of Base Station Information Collection System
[2-2] Function of Base Station Information Collection System
[2-3] Operation of Base Station Information Collection System
[3] Summary
[1] Position Estimation System
[1-1] Overview of Position Estimation System First, an overview of a position estimation system 1 according to the present embodiment will be described with reference to FIG. 1.

FIG. 1 is an explanatory view showing a configuration example of the position estimation system 1 according to an embodiment. The position estimation system 1 includes a radio communication apparatus 20, base stations 30A, 30B, 30C, and 30D, and a position estimation server 40.

The base stations 30A, 30B, 30C, and 30D relay communication between communication apparatuses that are spatially scattered. For example, the base stations 30A, 30B, 30C, and 30D can relay radio communication between some radio communication apparatus 20 and another radio communication apparatus (not shown) in the respective radio wave coverage or relay communication between the radio communication apparatus 20 and a communication apparatus connected to the base stations 30A, 30B, 30C, and 30D respectively by wire.

More specifically, the base stations 30A, 30B, 30C, and 30D may be base stations of wireless LAN (Local Area Network) conforming to the WiFi (Wireless Fidelity) standard, base stations of GSM (Global System for Mobile Communications), or base stations of Bluetooth. If there is no need to distinguish the base stations, the base stations 30A, 30B, 30C, and 30D will herein be generically denoted simply as the base station 30.

In addition to signals transmitted for relaying radio communication, the base station 30 can periodically transmit a beacon signal to signal the presence of the base station 30 therearound. The beacon signal contains, for example, a base station ID such as a MAC address as base station identification information attached to the base station 30. As a result, the radio communication apparatus 20 can verify the presence of the base station 30 present therearound based on the base station ID contained in the received beacon signal.

The radio communication apparatus 20 can transmit and receive various kinds of data based on radio communication controlled by the base station 30. For example, the radio communication apparatus 20 can receive content data from a content delivery server (not shown) or transmit/receive electronic mails to/from another radio communication apparatus (not shown) via the base station 30. The content data includes music data of music, lectures, and radio programs and the like, video data of movies, TV programs, video programs, photos, pictures, charts and the like, and other data such as games and software.

While a portable game machine is shown in FIG. 1 as an example of the radio communication apparatus 20, the radio communication apparatus 20 may be, for example, an information processing apparatus such as a PC (Personal Computer), home video processing apparatus (such as a DVD recorder and VCR), mobile phone, PHS (Personal Handyphone System), mobile music reproducing apparatus, mobile video processing apparatus, PDA (Personal Digital Assistant), home game machine, and household electrical appliance.

When a signal (for example, a beacon signal) is received from each of the base stations 30, the radio communication apparatus 20 can measure signal strength of the signal, associate the measured signal strength with the base station ID of each of the base stations 30, and transmit the signal strength to the position estimation server 40 as intensity measurement information.

The position estimation server 40 has base station information in which information about the position where each of the base stations 30 is set up and the base station ID are associated in advance stored therein and has a function to estimate the position of the radio communication apparatus 20 from, for example, the principle of triangulation based on the signal strength information received from the radio communication apparatus 20 and the base station information. The position estimation server 40 notifies the radio communication apparatus 20 of the estimated position, so that the radio communication apparatus 20 can recognize the position of the local terminal. The position estimation server 40 can respond to a position estimation request not only from the radio communication apparatus 20, but also from a plurality of other radio communication apparatuses.

Thus, the position estimation method using a signal transmitted from the base station 30 is more effective than the position estimation method using GPS in that the method can be executed indoors or underground if the radio communication apparatus 20 is present within the radio wave coverage of the base station 30.

[1-2] Hardware Configuration of Radio Communication Apparatus

In the foregoing, an overview of the position estimation system 1 has been described with reference to FIG. 1. Subsequently, the hardware configuration of the radio communication apparatus 20 constituting the position estimation system 1 will be described with reference to FIG. 2.

Figure 2:
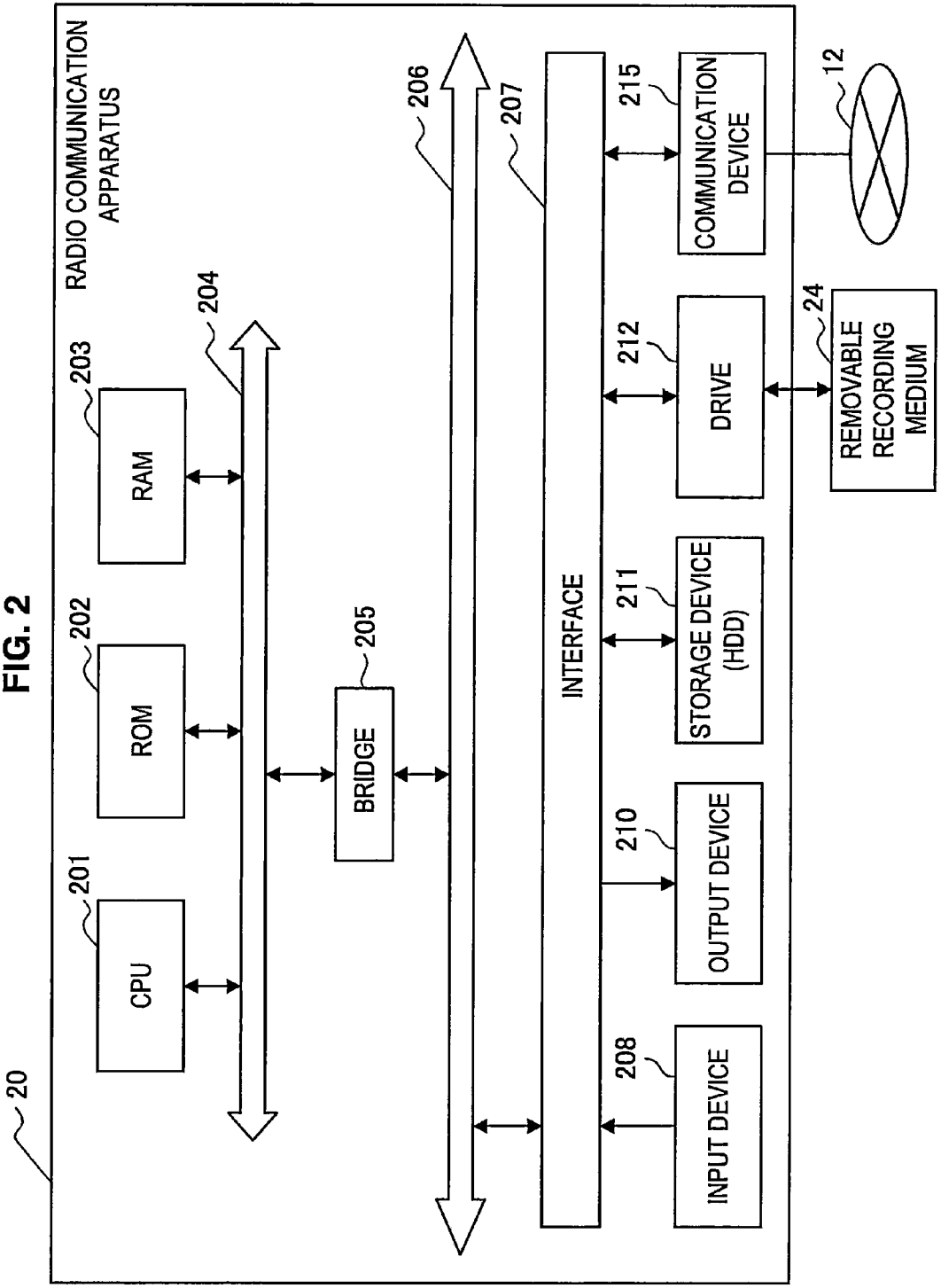
FIG. 2 is a block diagram showing the hardware configuration of a radio communication apparatus.

FIG. 2 is a block diagram showing the hardware configuration of the radio communication apparatus 20. The radio communication apparatus 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212, and a communication device 215.

The CPU 210 functions as an arithmetic processing device and a control device and controls the overall operation inside the radio communication apparatus 20 according to various programs. The CPU 201 may be a microprocessor. The ROM 202 stores programs, arithmetic parameters and the like used by the CPU 201. The RAM 203 temporarily stores programs used for execution of the CPU 201 and parameters that change as appropriate during execution thereof. These components are mutually connected by the host bus 204 constituted by a CPU bus or the like.

The host bus 204 is connected to the external bus 206 such as a PCI (Peripheral Component Interconnect/Interface) bus via the bridge 205. Incidentally, the host bus 204, the bridge 205, and the external bus 206 need not necessarily be constituted separately and these functions may be implemented by one bus.

The input device 208 is constructed of an input means for inputting information by a user such as a mouse, keyboard, touch panel, button, microphone, switch, and lever and an input control circuit to generate an input signal based on an input signal by the user and to output the input signal to the CPU 201. The user of the radio communication apparatus 20 can input various kinds of data into the radio communication apparatus 20 or provide instructions of processing operation by operating the input device 208.

The output device 210 is constructed of a display device such as a CRT (Cathode Ray Tube) display device, liquid crystal display (LCD) device, OLED (Organic Light Emitting Display) device, and lamp and a sound output device such as a speaker and headphone. The output device 210 outputs, for example, reproduced content. More specifically, the display device displays various kinds of information such as reproduced video data as text or images. The sound output device, on the other hand, converts reproduced sound data or the like into sound and outputs the sound.

The storage device 211 is a device for data storage constructed as an example of the storage unit of the radio communication apparatus 20 according to the present embodiment. The storage device 211 may include a storage medium, a recording device to record data in the storage medium, a reading device to read data from the storage medium, or a deletion device to delete data recorded in the storage medium. The storage device 211 is constructed of, for example, an HDD (Hard Disk Drive). The storage device 211 drives a hard disk to store programs executed by the CPU 201 or various kinds of data. The storage device 211 also stores map information, intensity measurement information, log information and the like described later.

The drive 212 is a reader writer for storage medium and is added to the radio communication apparatus 20 internally or externally. The drive 212 reads information recorded in a removable storage medium 24 such as an inserted magnetic disk, optical disk, magneto-optical disk, and semiconductor memory and outputs the information to the RAM 203.

The communication device 215 is a communication interface constructed of, for example, a communication device or the like to connect to a communication network 12. The communication device 215 may be a wireless LAN (Local Area Network) compliant communication device, wireless USB compliant communication device, or wire communication device that performs communication by wire. The communication device 215 transmits/receives various kinds of data to/from the position estimation server 40 or the base station 30 via the communication network 12. The communication device 215 can also communicate with an information processing server 50 described later.

The hardware configuration of the position estimation server 40 or the information processing server 50 described later may be made substantially the same as that of the radio communication apparatus 20 and thus, a detailed description thereof is omitted.

[1-3] Function of Position Estimation System

Next, the function of the position estimation system 1 according to the present embodiment will be described in detail with reference to FIGS. 3 to 5.

Figure 3:
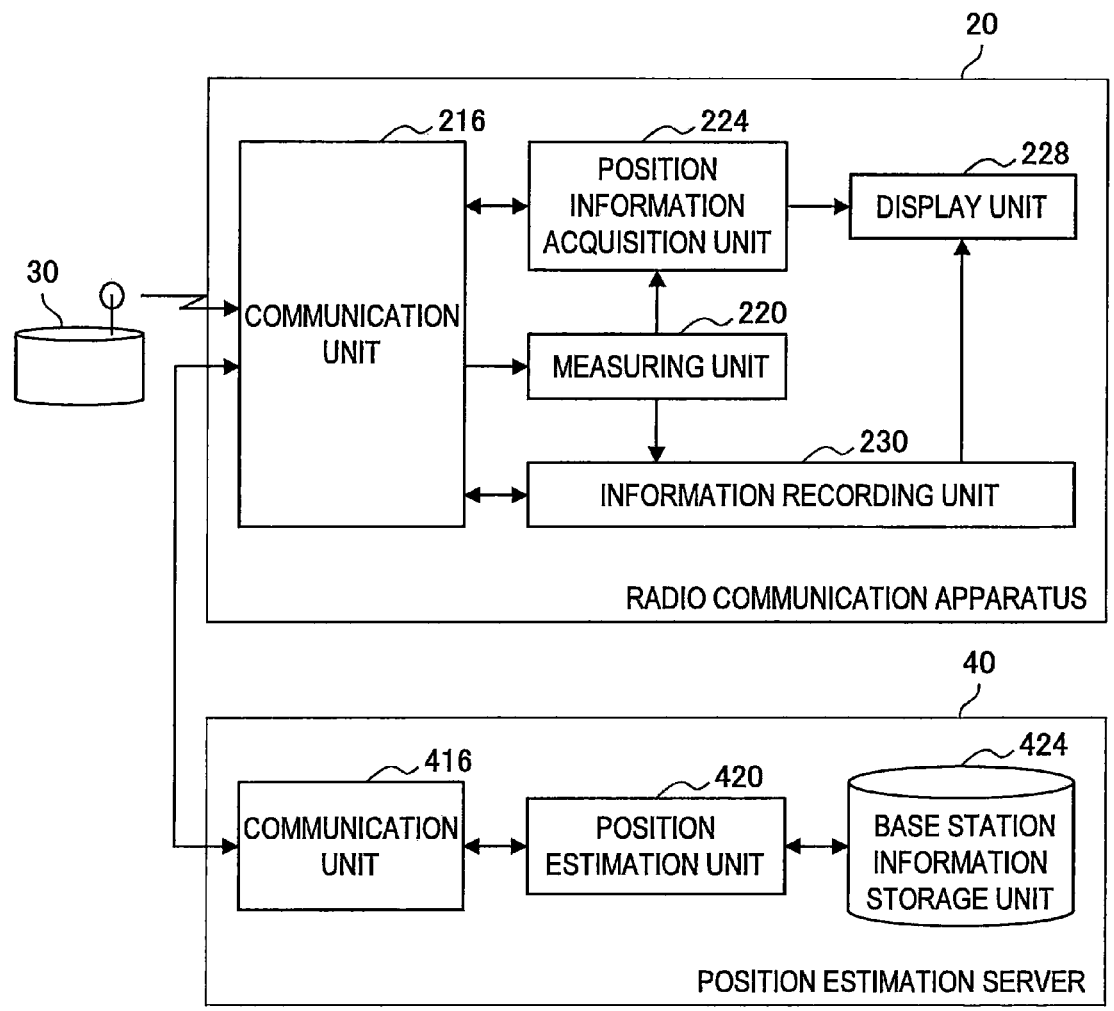
FIG. 3 is a block diagram showing the configuration of the radio communication apparatus and a position estimation server contained in the position estimation system according to the present embodiment.

FIG. 3 is a block diagram showing the configuration of the radio communication apparatus 20 and the position estimation server 40 contained in the position estimation system 1 according to the present embodiment. As shown in FIG. 3, the radio communication apparatus 20 includes a communication unit 216, a measuring unit 220, a position information acquisition unit 224, an information recording unit 230, and a display unit 228. The position estimation server 40 includes a communication unit 416, a position estimation unit 420, and a base station information storage unit 424.

The communication unit 216 is an interface to transmit/receive information to/from the base station 30 or the position estimation server 40. The communication unit 216 has, for example, a function as a transmitting unit to transmit intensity measurement information to the position estimation server 40 or a function as a receiving unit to receive a radio signal from the base station 30. The communication unit 216 may be a wireless LAN compliant communication apparatus, wireless USB compliant communication apparatus, or wire communication apparatus that performs communication by wire. Moreover, the communication unit 216 can transmit/receive information to/from not only one radio terminal, but also any number of two or more radio terminals.

The measuring unit 220 measures receiving intensity of a signal received by the communication unit 216 and transmitted from each of the base stations 30. When the positional relationship between the radio communication apparatus 20 and each of the base stations 30 is as shown in FIG. 1, FIG. 4 shows an example of receiving intensity measured by the measuring unit 220.

FIG. 4 is an explanatory view showing an example of receiving intensity measured by the measuring unit 220. In FIG. 4, it is assumed for convenience of description that the reference numeral attached to each of the base stations 30 is the base station ID of each of the base stations 30. More specifically, FIG. 4 shows a case in which receiving intensity of a signal transmitted from the base station 30A whose base station ID is "30A" is "−90 dBm", receiving intensity of a signal transmitted from the base station 30B whose base station ID is "30B" is "−70 dBm", receiving intensity of a signal transmitted from the base station 30C whose base station ID is "30C" is "−80 dBm", receiving intensity of a signal transmitted from the base station 30D whose base station ID is "30D" is "−75 dBm".

The position information acquisition unit 224 transmits receiving intensity measured by the measuring unit 220 as intensity measurement information to the position estimation server 40 in response to a request of the user of, for example, the radio communication apparatus 20. Then, the position information acquisition unit 224 acquires position information of the radio communication apparatus 20 estimated based on the intensity measurement information by the position estimation server 40 from the position estimation server 40. Details of the position estimation method by the position estimation server 40 will be described later.

The display unit 228 displays position information acquired by the position information acquisition unit 224 by superimposing the position information on a map. The user of the radio communication apparatus 20 can grasp the current position based on the display by the display unit 228.

The information recording unit 230 records the intensity measurement information acquired by the measuring unit 220 and the current position input by the user of, for example, the radio communication apparatus 20 as log information by associating with the current time. A detailed function of the information recording unit 230 will be described in [2-2] Function of Base Station Information Collection System.

The communication unit 416 of the position estimation server 40 is an interface with the radio communication apparatus 20 and receives intensity measurement information from the radio communication apparatus 20 and transmits position information estimated by the position estimation unit 420 to the radio communication apparatus 20.

The position estimation unit 420 estimates the current position of the radio communication apparatus 20 based on the intensity measurement information received from the radio communication apparatus 20 via the communication unit 416 and base station information recorded in the base station information storage unit 424.

The base station information storage unit 424 associates and stores the base station ID of a base station performing radio communication with the radio communication apparatus 20 and position information indicating the installation location of the base station as base station information. An example of the base station information stored in the base station information storage unit 424 will be described with reference to FIG. 5.

FIG. 5 is an explanatory view showing an example of base station information stored by the base station information storage unit 424. As shown in FIG. 5, the base station information storage unit 424 associates and stores the base station ID and the latitude and longitude as position information where the base station is set up. FIG. 5 shows an example in which the base station 30A whose base station ID is "30A" is registered in the base station information storage unit 424 by assuming that the base station 30A is set up at "135.001" longitude (east longitude) and "35.49" latitude (north latitude).

Similarly, the base station 30B whose base station ID is "30B", the base station 30C whose base station ID is "30C", and the base station 30D whose base station ID is "30D" are registered in the base station information storage unit 424 by assuming that the base station 30B is set up at "135.002" longitude (east longitude) and "35.51" latitude (north latitude), the base station 30C is set up at "135.003" longitude (east longitude) and "35.50" latitude (north latitude), and the base station 30D is set up at "135.002" longitude (east longitude) and "35.47" latitude (north latitude). The same number as the reference numeral of the corresponding base station is used herein as the base station ID.

The format of position information stored in the base station information storage unit 424 is not limited to the format using the latitude and longitude and may be, for example, a format using x and y coordinates or a format using polar coordinates.

The base station information storage unit 424 may be a nonvolatile memory such as an EEPROM (Electrically Erasable Programmable Read-Only Memory) and EPROM (Erasable Programmable Read Only Memory), a magnetic disk such as a hard disk and floppy (registered trademark) disk, an optical disk such as CD-R (Compact Disk Recordable)/RW (ReWritable), DVD-R (Digital Versatile Disk Recordable)/RW/+R/+RW/RAM (Ramdam Access Memory), and BD (Blu-Ray Disc (registered trademark))-RBD-RE, and an MO (Magneto Optical) disk.

Returning to the description of FIG. 3, the position estimation unit 420 estimates the position where the radio communication apparatus 20 is present based on intensity measurement information received from the radio communication apparatus 20 via the communication unit 416 in response to a position estimation request from the radio communication apparatus 20 and base station information registered in the base station information storage unit 424.

For example, the position estimation unit 420 estimates a position O of the radio communication apparatus 20 using the intensity measurement information shown in FIG. 4 and base station information registered in the base station information storage unit 424 and based on Formula 1 shown below:

[Math 1]
$$O = \frac{1}{W} \cdot \sum_i (Wi \cdot Ai) \quad \text{(Formula 1)}$$

[Math 2]
$$Wi = \frac{1}{distS(O, Ai)} \quad \text{(Formula 2)}$$

[Math 3]
$$W = \sum_i Wi \quad \text{(Formula 3)}$$

In Formula 1, Ai denotes position information of the i-th base station registered in the base station information storage unit 424. Thus, if base station information is represented by the longitude and latitude as in FIG. 5, Formula 1 is applied to each of the longitude and latitude. Wi is, as shown in Formula 2, a weighting factor obtained based on distS(O, Ai) indicating a distance between the radio communication apparatus 20 and the i-th base station estimated from receiving intensity. W is, as shown in Formula 3, a total sum of weighting factors.

Referring to Formula 1, position information of a base station whose distS(O, Ai) is small is reflected in the position O of the radio communication apparatus 20 significantly. On the other hand, position information of a base station whose distS(O, Ai) is large has a small influence on the position O of the radio communication apparatus 20. By using the above Formula 1, the position estimation unit 420 can rationally estimate the position O of the radio communication apparatus 20. Then, by notifying the radio communication apparatus 20 of the position O estimated by the position estimation unit 420, the user who uses the radio communication apparatus 20 can check the position of the user.

The position estimation method of the radio communication apparatus 20 is not limited to the method using the above Formula 1 and, for example, the position of the base station 30 that is the source of a signal with the highest receiving intensity in the radio communication apparatus 20 may be estimated as the position of the radio communication apparatus 20. Alternatively, the position that is the center of base stations that are sources of signals whose receiving intensity in the radio communication apparatus 20 is equal to or more than a predetermined threshold may be estimated as the position of the radio communication apparatus 20. Alternatively, the position that is the center of base stations that are sources of signals whose receiving intensity in the radio communication apparatus 20 is within a predetermined ratio such as top 10% or 20% may be estimated as the position of the radio communication apparatus 20. Alternatively, the position that is the center of base stations that are sources of signals whose receiving intensity in the radio communication apparatus 20 is within predetermined ranking such as top five or ten may be estimated as the position of the radio communication apparatus 20.

The above position estimation system 1 can estimate, for example, the position of the radio communication apparatus 20 based on signal strength of a signal received by the radio communication apparatus 20 compliant with wireless LAN from the base station 30 of wireless LAN. Base stations of wireless LAN are likely to be set up everywhere such as indoors and underground. Thus, if the radio communication apparatus 20 is compliant with wireless LAN, the position estimation system 1 can estimate the position of the radio communication apparatus 20 regardless of the location of presence of the radio communication apparatus 20.

[2] Base Station Information Collection System

[2-1] Overview of Base Station Information Collection System

As described with reference to FIGS. 3 to 5, it is necessary for the position estimation system 1 according to the present embodiment to register base station information on the position estimation server 40 in advance to estimate the position of the radio communication apparatus 20. A base station information collection system 2 according to the present embodiment is constructed by focusing on efficiently collecting such base station information. An overview of the base station information collection system 2 will be described below.

As a method of collecting base station information, a method by which a person randomly moves while carrying a mobile apparatus capable of receiving a radio signal transmitted from the base station 30 and the mobile apparatus sequentially receives the radio signal to store intensity measurement information of the radio signal can be considered. If the intensity measurement information stored by the mobile apparatus contains any base station ID of a known base station whose base station ID is known, position information of an unknown base station whose base station ID is unknown can be estimated fast or easily based on the position information of the known base station having the base station ID. Even if no base station ID of known base stations is contained in one piece of intensity measurement information stored in the mobile apparatus, position information of an unknown base station having an unknown base station ID contained in the one piece of intensity measurement information can be estimated based on a plurality of pieces of intensity measurement information.

However, base station IDs collected by the above method depend on, for example, the movement path of the user who moves the radio communication apparatus 20. Thus, if the user of the radio communication apparatus 20 moves only in the neighborhood of known base stations whose base station IDs are known, there is a problem that no new base station information is obtained so that the collection of information becomes inefficient.

Moreover, radio service operators set up base stations in stations or restaurants to provide services that grant usage rights of the base stations to the radio communication apparatus 20 registered with the radio service operators. Such base stations set up by radio service operators are frequently unknown base stations whose base station ID is not made public, though position information thereof is made public.

Thus, the above situations led to creation of the base station information collection system 2 capable of preferentially collecting base station IDs of unknown base stations by notifying the user of the radio communication apparatus 20 of position information of unknown base stations. The base station information collection system 2, which is an example of the information processing system, will be described below in detail.

[2-2] Function of Base Station Information Collection System

FIG. 6 is a functional block diagram showing the configuration of the radio communication apparatus 20 and the information processing server 50 contained in the base station information collection system 2 according to the present embodiment.

As shown in FIG. 6, the information recording unit 230 of the radio communication apparatus 20 includes a recording unit 232, a storage unit 234, and an operation unit 236. The information processing server 50 includes a communication unit 516, an extraction unit 520, an operation unit 524, a processing unit 528, and a storage unit 532 and functions as an information processing apparatus.

The recording unit 232 records intensity measurement information obtained by the measuring unit 220 in the storage unit 234. In the present embodiment, the measuring unit 220 measures receiving intensity of radio signals received by the communication unit 216 in a predetermined period to obtain intensity measurement information and the recording unit 232 records the intensity measurement information obtained in a predetermined period by the measuring unit 220 in the storage unit 234.

The storage unit 234 stores map information, unknown base station information, intensity measurement information and log information. The map information is information that causes the display unit 228 to display a map. The map information may contain detailed information of a specific region such as underground and indoors outside radio wave coverage of base stations whose radio wave coverage is another region. The detailed information includes, for example, a guide map of a building or underground shopping mall. An icon indicating the presence of detailed information may be superimposed on a map displayed in the display unit 228 so that when the icon is selected, the applicable detailed information is displayed.

The unknown base station information is information in which position information of unknown base stations whose base station ID is unknown and ESSID, which is an example of base station attached information attached to each base station, are associated. A concrete example of such unknown base station information will be described with reference to FIG. 7.

FIG. 7 is an explanatory view showing a concrete example of unknown base station information. As shown in FIG. 7, unknown base station information has ESSID and position information including the longitude and latitude associated therein. In the example shown in FIG. 7, unknown base stations whose ESSID is "newdoor" are present at "135.005" longitude and "35.41" latitude and at "134.938" longitude and "36.25" latitude. Also in the example shown in FIG. 7, an unknown base station whose ESSID is "livestation" is present at "135.003" longitude and "35.53" latitude.

The display unit 228 displays position information of such unknown base stations by superimposing the position information on a map expanded based on map information. An example of the display screen displayed by the display unit 228 in this manner will be described with reference to FIG. 8.

Figure 8:
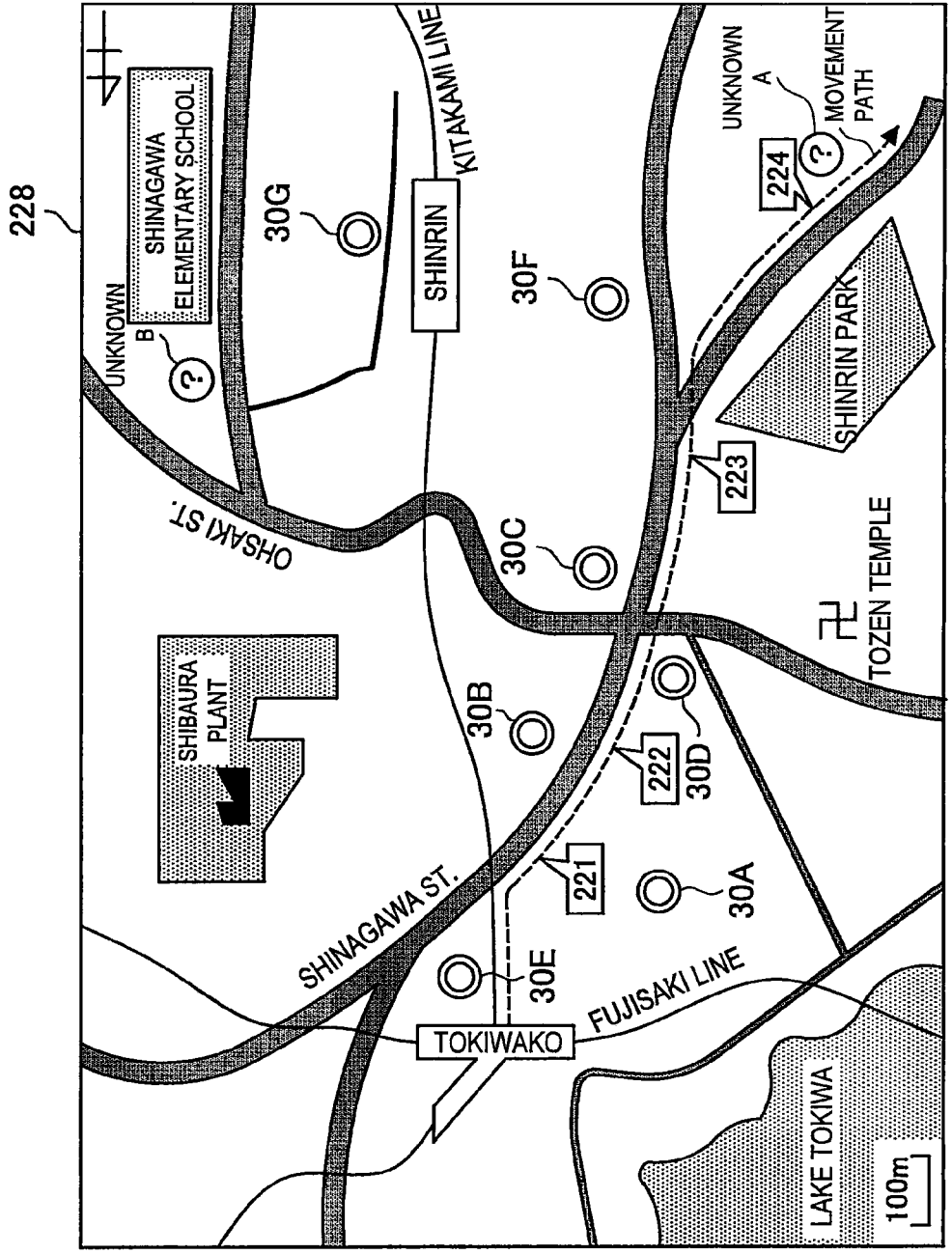
FIG. 8 is an explanatory view showing an example of a display screen displayed by a display unit.

FIG. 8 is an explanatory view showing an example of the display screen displayed by the display unit 228. As shown in FIG. 8, positions of unknown base stations (Unknown A, Unknown B) are superimposed on a map displayed in the display unit 228. The user of the radio communication apparatus 20 can grasp the positions of unknown base stations by viewing the display unit 228, so that the user can move to the neighborhood of such unknown base stations.

That is, the display unit 228 has a function as a notification unit that notifies the user of the radio communication apparatus 20 of position information of unknown base stations. The display unit 228 is shown only as an example of the notification unit, and the notification unit may make a notification of position information of unknown base stations by sound or by increasing the speed of flashing as the distance between an unknown base station and the radio communication apparatus 20 becomes closer.

In the example shown in FIG. 8, installation locations of base stations 30A, 30B, 30C, 30D, 30E, 30F, and 30G whose base station ID is known are also displayed in the display unit 228, but need not necessarily be displayed.

Here, a case in which the display screen shown in FIG. 8 is displayed in the display unit 228 and the user of the radio communication apparatus 20 moves from "Tokiwako Station" toward an unknown base station (Unknown A) along a movement path denoted by a dotted line in FIG. 8 will be considered.

In this case, the measuring unit 220 obtains intensity measurement information by receiving intensity of a radio signal received from the base station 30 therearound being measured by the communication unit 216 in a predetermined period, and the recording unit 232 records the intensity measurement information in the storage unit 234. FIG. 8 shows a case in which intensity measurement information is obtained at positions to which data numbers "221", "222", "223", and "224" are attached. Such intensity measurement information will be described with reference to FIG. 9.

Figure 9:
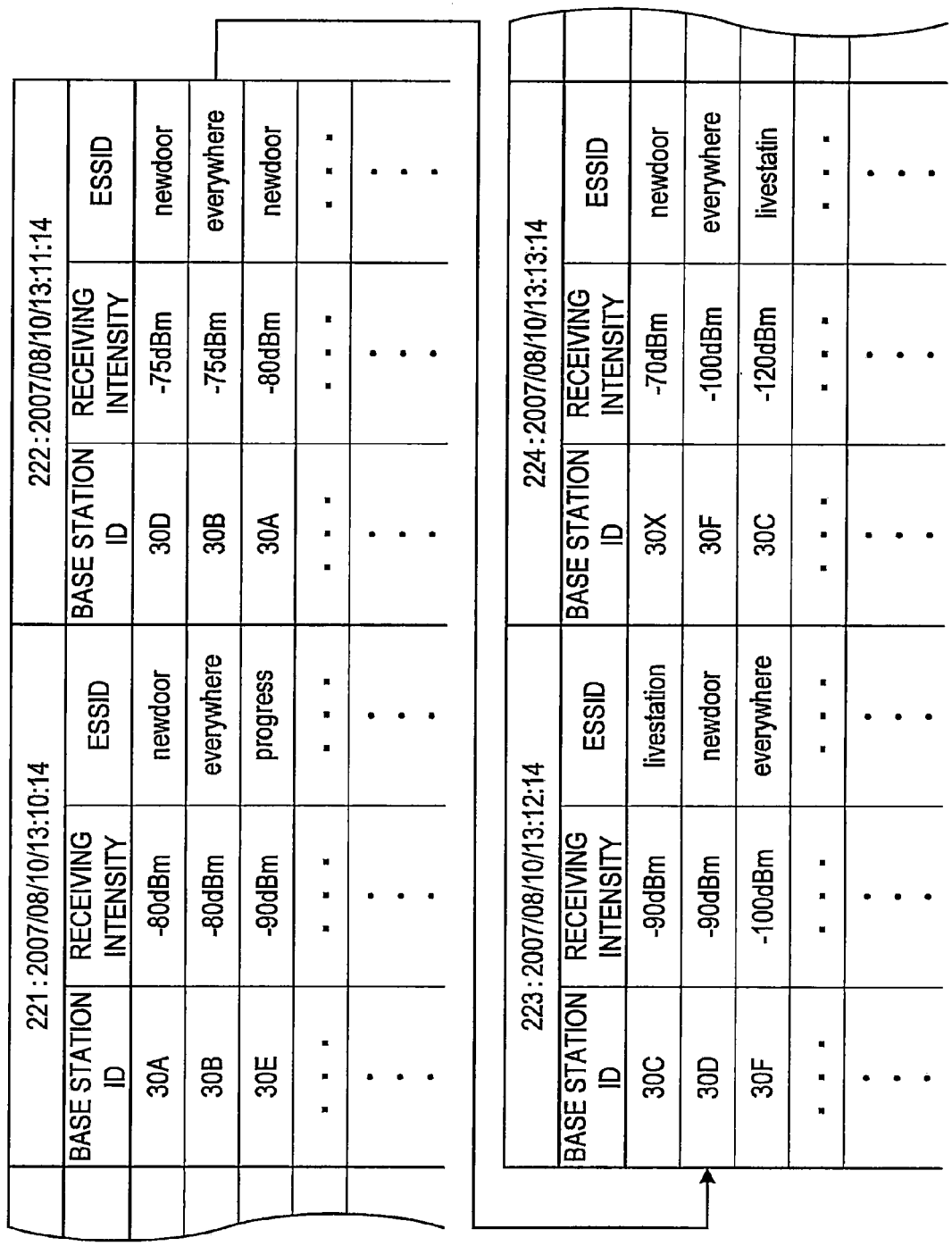
FIG. 9 is an explanatory view showing a concrete example of intensity measurement information.

FIG. 9 is an explanatory view showing a concrete example of intensity measurement information. As shown in FIG. 9, each piece of intensity measurement information includes the data number, acquisition time, base station ID, receiving intensity, and ESSID. For example, FIG. 9 shows that intensity measurement information of the data number "221" is acquired at "2007/08/10/13:10:14", a signal is received from the base station 30A with the receiving intensity "−80 dBm", and ESSID of the base station 30A is "newdoor". Incidentally, information of intensity measurement information in which one base station ID is associated with one piece of receiving intensity and one ESSID may herein be called individual intensity measurement information.

Returning to the description of the configuration of the base station information collection system 2 with reference to FIG. 6, the operation unit 236 accepts various operations by the user of the radio communication apparatus 20 to output instructions in accordance with the operation or convert the operation into a data signal in accordance with the operation. For example, the operation unit 236 has a function as the position information acquisition unit through which the current position and current time are input by the user.

More specifically, when the user arrives at the neighborhood of an unknown base station, the user can select some position on the map displayed in the display unit 228 or in detailed information as the current position via the operation unit 236. The recording unit 232 records the current position selected via the operation unit 236 and the current time (for example, the longitude "135.005", the latitude "35.41", and the time "2007/08/10/13:13:20") in the storage unit 234 as log information.

In this manner, intensity measurement information and log information are recorded in the storage unit 234 by the recording unit 232. Incidentally, the storage unit 234 may be, like the base station information storage unit 424 of the position estimation server 40, a nonvolatile memory such as an EEPROM and EPROM, a magnetic disk such as a hard disk and floppy (registered trademark) disk, an optical disk such as CD-R, DVD-R/RW/+R/+RW/RAM, and BD (Blu-Ray Disc (registered trademark))R/BD-RE, and an MO disk. The configuration having a storage function is generically denoted as the storage unit 234 in FIG. 6, unknown base station information, intensity measurement information, and log information may be stored in physically different storage media.

The communication unit 516 of the information processing server 50 is an interface with the radio communication apparatus 20 and receives intensity measurement information and log information from the radio communication apparatus 20. The method of receiving intensity measurement information and log information by the information processing server 50 from the radio communication apparatus 20 is not limited to the method by wire or by radio via the communication unit 516, and intensity measurement information and log information may be received by the method by which a storage medium removably provided in the radio communication apparatus 20 is mounted on the information processing server 50.

The extraction unit 520 extracts the base station ID of an unknown base station based on log information from the intensity measurement information acquired from the radio communication apparatus 20. More specifically, the extraction unit 520 extracts the acquisition time of position information associated with the position information whose difference from position information of an unknown base station is within the range of a setting distance (within a first setting range, for example, 10 m) of the log information. The acquisition time of such position information could indicate the time at which the radio communication apparatus 20 was moved to the neighborhood of the position of the unknown base station.

Then, the extraction unit 520 extracts intensity measurement information associated with a time whose difference from the acquisition time of the extracted position information is within a setting time (within a second setting range, for example, one minute). Such intensity measurement information is likely to be intensity measurement information obtained near the position of an unknown base station. Further, the extraction unit 520 extracts individual intensity measurement information associated with the same ESSID as that of a desired unknown base station from the extracted intensity measurement information.

If a plurality of pieces of individual intensity measurement information is extracted based on log information by the extraction unit 520, the user who operates the extraction unit 520 or the operation unit 524 extracts the base station ID of an unknown base station from the plurality of pieces of individual intensity measurement information.

For example, the extraction unit 520 may extract the base station ID contained in individual intensity measurement information with the highest receiving intensity of the plurality of pieces of individual intensity measurement information as the base station ID of an unknown base station. Alternatively, the user of the radio communication apparatus 20 may extract the base station ID considered to be appropriate among the plurality of pieces of individual intensity measurement information via the operation unit 524 as the base station ID of an unknown base station.

The processing unit 528 associates and records the base station ID extracted by the extraction unit 520 or the operation unit 524 and position information of an unknown base station in the storage unit 532 as base station information of a known base station. The base station information recorded in the storage unit 532 in this manner can be utilized, for example, for position estimation shown in FIG. 3 for description. The storage unit 532 may be the same as the base station information storage unit 424.

[2-3] Operation of Base Station Information Collection System

In the foregoing, the function of the base station information collection system 2 according to the present embodiment has been described with reference to FIGS. 6 to 9. Subsequently, an example of the radio communication method executed in the base station information collection system 2 will be described with reference to FIGS. 10 and 11.

Figure 10:
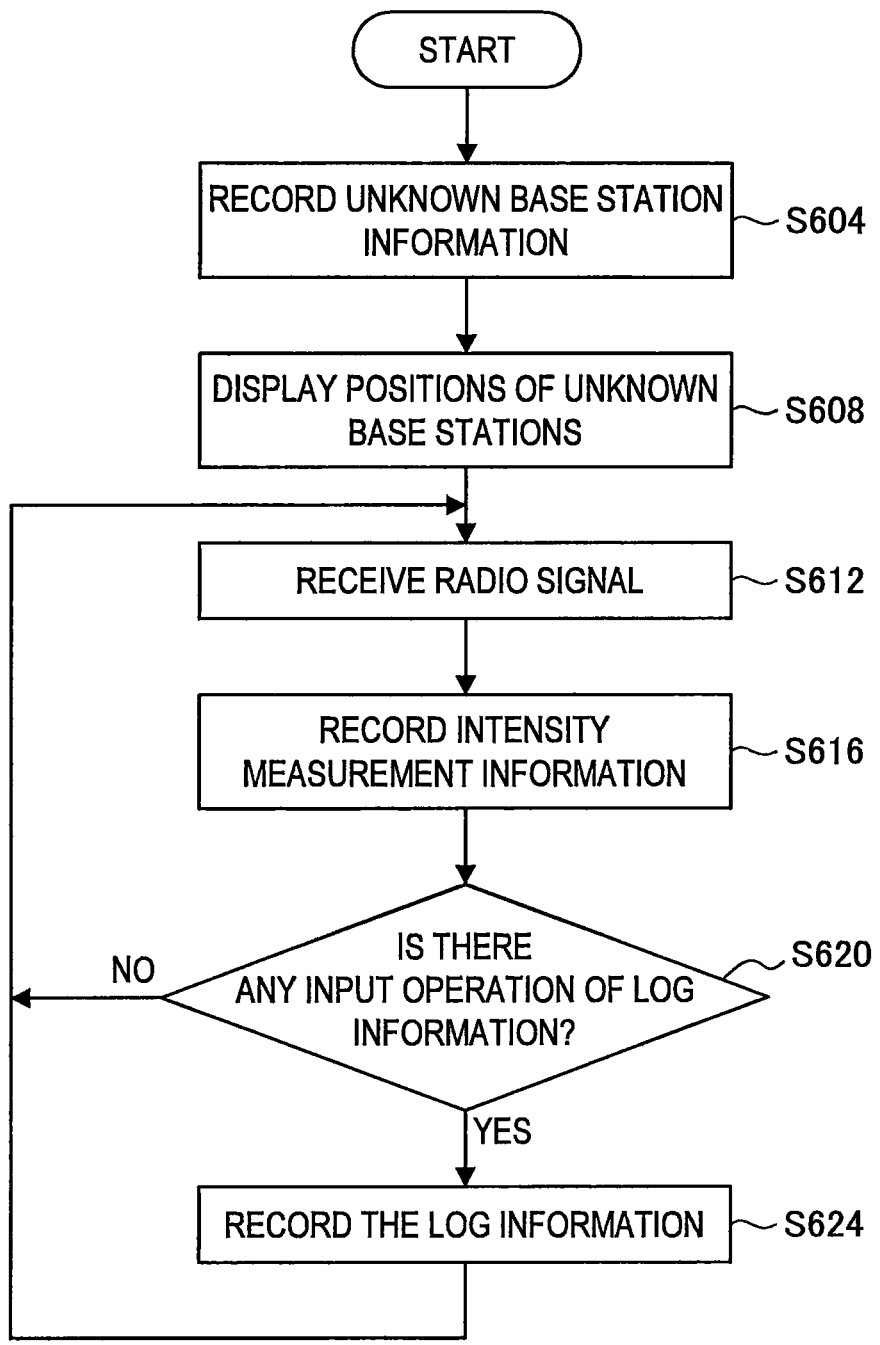
FIG. 10 is a flow chart showing the flow of a collection method of the intensity measurement information and log information by the radio communication apparatus.

FIG. 10 is a flow chart showing the flow of a collection method of intensity measurement information and log information by the radio communication apparatus 20. As shown in FIG. 10, the radio communication apparatus 20 first records position information and ESSID of unknown base stations in the storage unit 234 as unknown base station information (S604). Then, the display unit 228 of the radio communication apparatus 20 displays positions of the unknown base stations based on the unknown base station information recorded in the storage unit 234 (S608).

Thereafter, when the communication unit 216 of the radio communication apparatus 20 receives a radio signal from the base station 30 therearound (S612), the measuring unit 220 measures receiving intensity of the radio signal received by the communication unit 216 to obtain intensity measurement information, and the recording unit 232 records the intensity measurement information in the storage unit 234 (S616). Subsequently, if an input operation of log information is performed in the operation unit 236 (S620), the recording unit 232 records the input log information in the storage unit 234 (S624) to repeat processing starting with S612.

Figure 11:
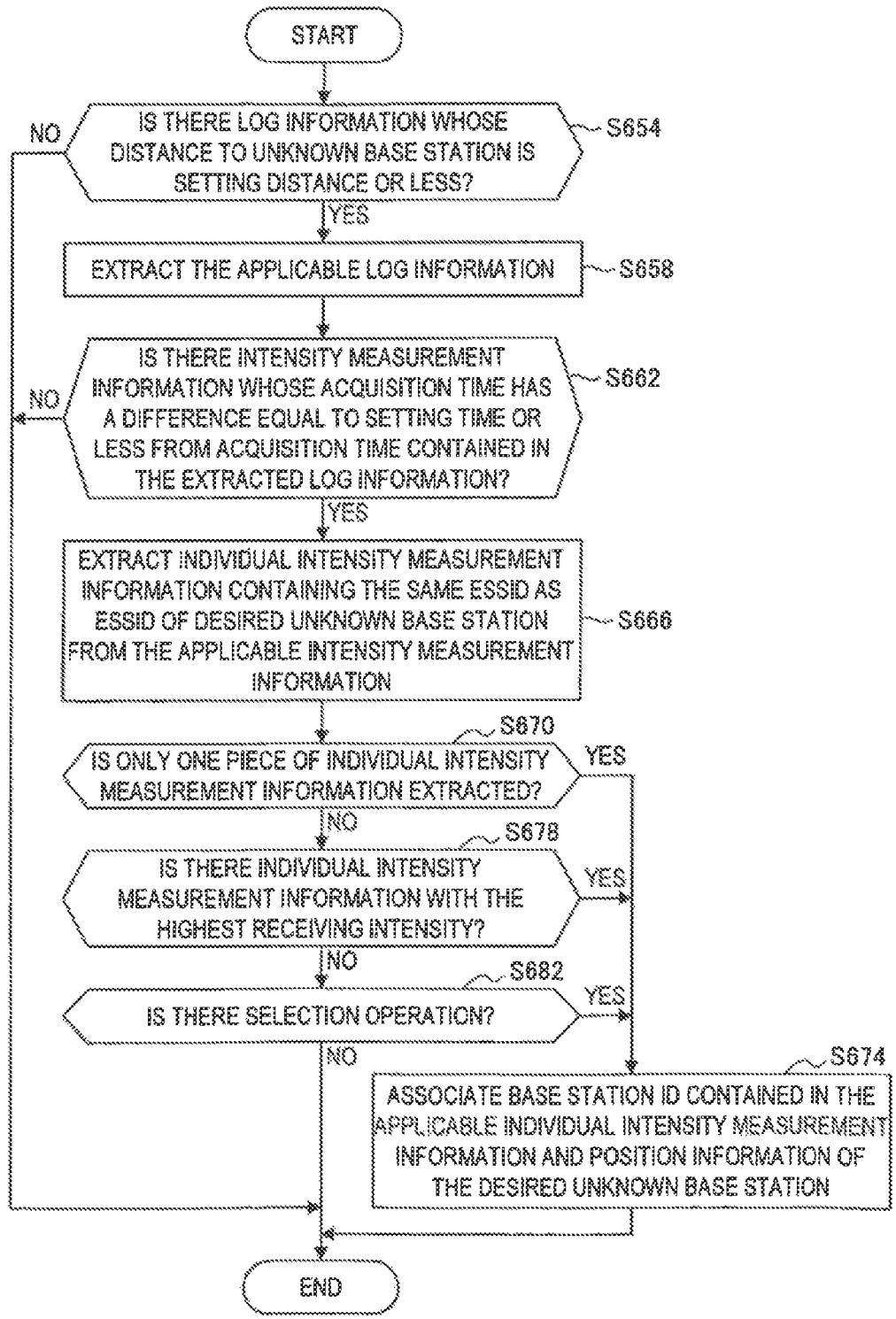
FIG. 11 is a flow chart showing the flow of operation of the information processing server.

FIG. 11 is a flow chart showing the flow of operation of the information processing server 50. As shown in FIG. 11, the extraction unit 520 of the information processing server 50 first determines whether there is, in log information recorded in the radio communication apparatus 20, any log information whose distance to an unknown base station is a setting distance or less (S654). If the extraction unit 520 determines that there is log information whose distance to an unknown base station is the setting distance or less, the extraction unit 520 extracts the applicable log information (S658).

Subsequently, the extraction unit 520 determines whether there is, in intensity measurement information recorded in the radio communication apparatus 20, any intensity measurement information whose acquisition time has a difference equal to a setting time or less from the acquisition time contained in the extracted log information (S662). If the extraction unit 520 determines that there is intensity measurement information whose acquisition time has a difference from the acquisition time contained in the extracted log information equal to a setting time or less, the extraction unit 520 extracts individual intensity measurement information containing the same ESSID as that of a desired unknown base station from the applicable intensity measurement information (S666).

If only one piece of individual intensity measurement information is extracted at 5666, the processing unit 528 associates and records the base station ID contained in the individual intensity measurement information and position information of the desired unknown base station in the storage unit 532 (S674).

If, on the other hand, a plurality of pieces of individual intensity measurement information is extracted at 5666, the extraction unit 520 determines whether there is individual intensity measurement information with the highest receiving intensity (S678). If the extraction unit 520 determines that there is individual intensity measurement information with the highest receiving intensity, the processing unit 528 associates and records the base station ID contained in the individual intensity measurement information and position information of the desired unknown base station in the storage unit 532 (S674).

If no individual intensity measurement information with higher receiving intensity is extracted by the extraction unit 520 and there is any selection operation by the user on the operation unit 524 (S682), the processing unit 528 associates and records the base station ID contained in the individual intensity measurement information selected by the user and the desired unknown base station in the storage unit 532 (S674).

If, on the other hand, a negative result is obtained at each of S654, 5662, and S682, the information collection by the radio communication apparatus 20 can be deemed to be insufficient so that recollection of information can be considered.

[3] Summary

In the base station information collection system 2 according to the present embodiment, as has been described above, the display unit 228 displays position information of unknown base stations recorded in the storage unit 234 and the user of a radio communication apparatus grasps the position information of unknown base stations. Thus, the radio communication apparatus 20 can be moved to the neighborhood of the position of an unknown base station with movement of the user of the radio communication apparatus 20 based on the display of position information of unknown base stations. Then, the communication unit 216 can receive a radio signal containing the base station ID of the unknown base station in the neighborhood of the position of the unknown base station from the unknown base station. Here, the recording unit 232 records intensity measurement information of the radio signal received by the communication unit 216 in the storage unit 234. As a result, the base station ID of the unknown base station is recorded in the storage unit 234 by the recording unit 232 and therefore, position information of the unknown base station and the base station ID can be associated by the information processing server 50.

When the position of each of the base stations 30 is estimated based on intensity measurement information of a specific region such as underground and indoors outside radio wave coverage of base stations whose radio wave coverage is another region, estimation processing becomes complicated at first because there are few constraints between the base stations 30. Thus, by collecting information about unknown base stations whose position information is known preferentially like the present embodiment, positions of the other base stations 30 can be estimated fast or easily.

It should be understood by those skilled in the art that various modifications, combinations, sub-combinations and alterations may occur depending on design requirements and other factors insofar as they are within the scope of the appended claims or the equivalents thereof.

In the above embodiment, for example, a case in which the measuring unit 220 measures receiving intensity of a radio signal received by the communication unit 216 in a predetermined period to obtain intensity measurement information or the user performs an input operation of log information in the neighborhood of the position of an unknown base station is described, but the present invention is not limited to such an example. For example, when the user reaches the neighborhood of the position of an unknown base station, the user may perform a predetermined operation on the operation unit 236 so that, after the predetermined operation being performed, the measuring unit 220 obtains intensity measurement information and the recording unit 232 records the intensity measurement information.

With the above configuration, only intensity measurement information containing the base station ID of an unknown base station is recorded in the storage unit 234 and therefore, processing to extract the base station ID of an unknown base station on the information processing server 50 can be simplified.

Moreover, a person is taken as an example of the movable body that moves the radio communication apparatus 20 in the above embodiment, but the present invention is not limited to such an example. For example, the movable body may be a flying device 60 as shown in FIG. 12.

FIG. 12 is an explanatory view showing a modification of the present embodiment. As shown in FIG. 12, the radio communication apparatus 20 is mounted on the flying device 60 and is moved with movement of the flying device 60. The radio communication apparatus 20 is provided with an imaging unit 250, and the communication unit 216 transmits images picked up by the imaging unit 250 to a remote device 254.

The remote device 254 displays the images received from the communication unit 216. The operator of the flying device 60 can control movement of the flying device 60 by operating a controller 60 while viewing images displayed in the remote device 254. The radio communication apparatus 20 may have any position estimation function such as GPS so that the current position estimated based on the position estimation function is transmitted to the remote device 254 by the communication unit 216. With the above configuration, the operator of the flying device 60 can grasp where the flying device 60 is flying more correctly.

Moreover, the communication unit 216 of the radio communication apparatus 20 has a function as the notification unit that notifies the operator of the remote device 254 of position information of an unknown base station by transmitting the position information to the remote device 254. The operator of the remote device 254 operates the controller 60 based on the notified position information of an unknown base station, so that the radio communication apparatus 20 mounted on the flying device 60 can be caused to efficiently collect position information of unknown base stations. With the above configuration, collection of base station IDs of unknown base stations set up in locations difficult for a person to approach is enabled.

Moreover, in the above embodiment, a case in which the user of the radio communication apparatus 20 manually inputs the current position is described, but the present invention is not limited to such an example. For example, any position estimation function such as GPS and triangulation using base station positions of mobile phones or PHS may be mounted on the radio communication apparatus 20 as the position information acquisition unit so that position information estimated by the position estimation function and the position estimation time are recorded in the storage unit 234 as log information.

Each step in processing of the base station information collection system 2 described herein need not necessarily be performed chronologically in the order described as a flow chart. For example, each step in processing of the base station information collection system 2 may contain processing performed in parallel or individually (for example, parallel processing or processing by an object).

A computer program that causes hardware such as the CPU 201, the ROM 202, and the RAM 203 contained in the radio communication apparatus 20 or the information processing server 50 to function similarly to the configuration of the radio communication apparatus 20 or the information processing server 50 can also be created. Also, a storage medium in which the computer program is stored is provided. Moreover, a sequence of processing can be realized by hardware by configuring each functional block shown in the functional block diagram of FIG. 6 by hardware.

The invention claimed is:

1. A radio communication apparatus capable of communicating with a base station of radio communication and moved with movement of a movable body, comprising:
   a storage unit having recorded therein position information of unknown base stations whose base station identification information attached to the base station is unknown;
   a notification unit that notifies the movable body or an operation subject of the movable body of the position information of the unknown base stations recorded in the storage unit;
   a communication unit that receives a radio signal containing the base station identification information from the base stations including the unknown base stations, wherein the radio signal further includes base station attached information attached to the base station that is the source of the radio signal; and
   a recording unit that records the base station identification information contained in the radio signal received by the communication unit in the storage unit, wherein the recording unit associates the base station attached information with the base station identification information and records the base station identification information and the base station attached information in the storage unit.

2. The radio communication apparatus according to claim 1, further comprising:
   a position information acquisition unit that acquires the position information of the radio communication apparatus, wherein
   the communication unit receives the radio signal in a predetermined period and
   the recording unit associates and records an acquisition time of the position information and the position information in the storage unit and associates a receiving time of the radio signal by the communication unit with the base station identification information contained in the radio signal received by the communication unit and records the base station identification information and the receiving time in the storage unit.

3. The radio communication apparatus according to claim 2, further comprising:
   a measuring unit that measures receiving intensity of each base station that is a source of the radio signal received by the communication unit, wherein
   the recording unit further associates the receiving intensity measured by the measuring unit with the base station identification information and the receiving time of the radio signal and records the base station identification information, the receiving time, and the receiving intensity in the storage unit.

4. The radio communication apparatus according to claim 1, further comprising:
   an operation unit in which a predetermined operation is performed by the movable body or the operation subject of the movable body, wherein
   when the predetermined operation is performed in the operation unit, the recording unit records the base station identification information contained in the radio signal received by the communication unit in the storage unit.

5. The radio communication apparatus according to claim 1, wherein the communication unit transmits the base station identification information recorded in the storage unit by the recording unit.

6. The radio communication apparatus according to claim 1, further comprising:
   an imaging unit that picks up an image therearound, wherein
   the notification unit notifies the operation subject of the movable body of the image picked up by the imaging unit.

7. An information processing system comprising a radio communication apparatus capable of communicating with a base station of radio communication and moved with movement of a movable body and an information processing apparatus that processes information acquired by the radio communication apparatus, wherein
   the radio communication apparatus includes:
   a storage unit having recorded therein position information of unknown base stations whose base station identification information attached to the base station is unknown;
   a notification unit that notifies the movable body or an operation subject of the movable body of the position information of the unknown base stations recorded in the storage unit;
   a communication unit that receives a radio signal containing the base station identification information transmitted from the base stations including the unknown base stations, wherein the radio signal further includes base station attached information attached to the base station that is the source of the radio signal; and
   a recording unit that records the base station identification information contained in the radio signal received by the communication unit in the storage unit, wherein the recording unit associates the base station attached information with the base station identification information and records the base station identification information and the base station attached information in the storage unit, and
   the information processing apparatus includes a processing unit that associates the base station identification information contained in the radio signal received by the communication unit near a position of the unknown base stations of the base station identification information recorded in the storage unit and the position information of the unknown base stations.

8. The information processing system according to claim 7, wherein the radio communication apparatus further comprises
   a position information acquisition unit that acquires the position information of the radio communication apparatus,
   the communication unit receives the radio signal in a predetermined period,
   the recording unit associates and records an acquisition time of the position information and the position information in the storage unit and associates a receiving time of the radio signal by the communication unit with the base station identification information contained in the radio signal received by the communication unit and records the base station identification information and the receiving time in the storage unit,
   the information processing apparatus further includes
   an extraction unit that extracts an acquisition time of the position information recorded by being associated with the position information whose difference from the position information of the unknown base station is within a first setting range in the storage unit, and
   the processing unit associates the base station identification information recorded by being associated with the receiving time whose difference from the acquisition time extracted by the extraction unit is within a second setting range and the position information of the unknown base station.

9. The information processing system according to claim 8, wherein the radio communication apparatus further comprises
   a measuring unit that measures receiving intensity of each base station that is a source of the radio signal received by the communication unit,
   the recording unit further associates the receiving intensity measured by the measuring unit with the base station identification information and the receiving time of the radio signal and records the base station identification information, the receiving time, and the receiving intensity in the storage unit, and
   the processing unit associates the base station identification information selected based on receiving intensity associated with the base station identification information of the base station identification information associated with the receiving time whose difference from the acquisition time extracted by the extraction unit is within the second setting range and the position information of the unknown base station.

10. A non-transitory computer-readable medium having stored therein a program causing a computer to function as a radio communication apparatus capable of communicating with a base station of radio communication and moved with movement of a movable body, the radio communication apparatus comprising:
    a notification unit that notifies the movable body or an operation subject of the movable body of the position information of the unknown base stations, the position information recorded in a storage medium;
    a communication unit that receives a radio signal containing the base station identification information transmitted from the base stations including the unknown base stations, wherein the radio signal further includes base station attached information attached to the base station that is the source of the radio signal; and
    a recording unit that records the base station identification information contained in the radio signal received by the communication unit in the storage medium, wherein the recording unit associates the base station attached information with the base station identification information and records the base station identification information and the base station attached information in the storage unit.

11. A radio communication method executed by a radio communication apparatus capable of communicating with a base station of radio communication and moved with movement of a movable body, comprising the steps of:
    Recording, in a storage medium, position information of an unknown base station whose base station identification information attached to the base station is unknown;
    notifying the movable body or an operation subject of the movable body of the position information of the unknown base stations recorded in the storage medium;
    receiving a radio signal containing the base station identification information transmitted from the base stations including the unknown base stations, wherein the radio signal further includes base station attached information attached to the base station that is the source of the radio signal;

recording the base station identification information contained in the radio signal received from the base station in the storage medium;

associating the base station attached information with the base station identification information; and recording the base station identification information and the base station attached information in the storage medium.

* * * * *